May 5, 1970 — J. B. NEWMAN — 3,509,758
GAS LEAK RATE MONITOR
Filed Sept. 16, 1968
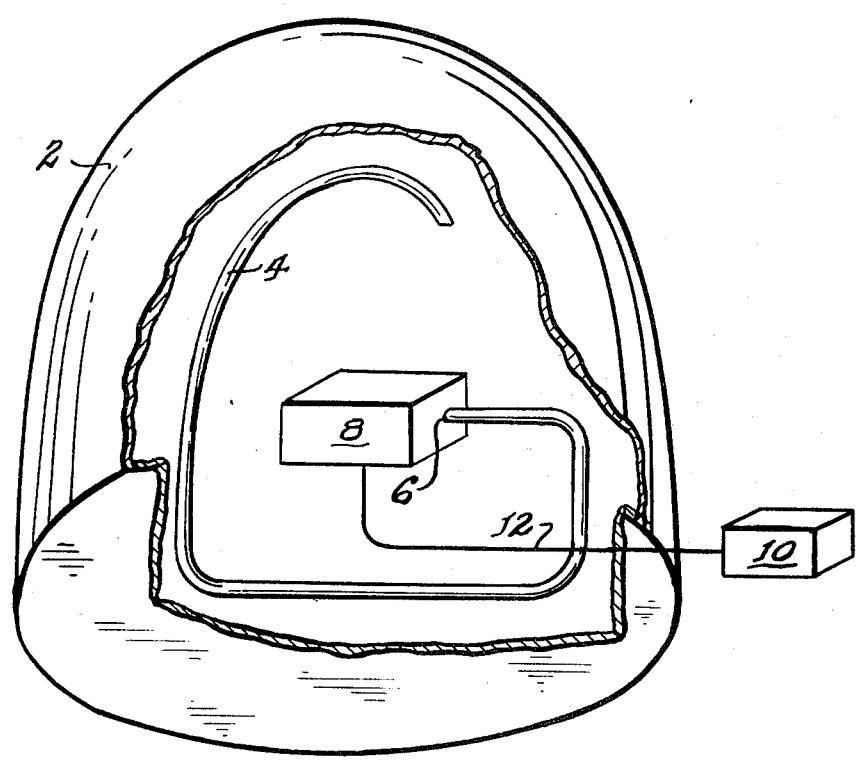
INVENTOR.
James B. Newman
BY
Attorney

United States Patent Office 3,509,758
Patented May 5, 1970

3,509,758
GAS LEAK RATE MONITOR
James B. Newman, Idaho Falls, Idaho, assignor to the United States of America as represented by the United States Atomic Energy Commission
Filed Sept. 16, 1968, Ser. No. 760,050
Int. Cl. G01 3/26
U.S. Cl. 73—49.2          5 Claims

ABSTRACT OF THE DISCLOSURE

A system for measuring the gas leak rate of a containment vessel includes a reference vessel positioned within the containment vessel and having an opening allowing the gas pressure in the containment vessel and the reference vessel to equalize, and a flow rate meter for measuring the amount of gas flowing between the containment vessel and the reference vessel through the reference vessel opening. By the Ideal Gas Law the amount of gas measured by the flow rate meter is representative of the leak rate of the containment vessel.

CONTRACTURAL ORIGIN OF THE INVENTION

The invention described herein was made in the course of, or under, a contract with the United States Atomic Energy Commission.

BACKGROUND OF THE INVENTION

This invention relates to systems for measuring the leak rate of gas containers and particularly to systems which determine the leak rate of a containment vessel by measuring the quantity of gas flowing between the containment vessel and a reference vessel positioned inside the containment vessel.

At present, systems for measuring the leak rate of a gas containment vessel are based on methods involving different applications of the Ideal Gas Law. One system, based on the so-called absolute method, measures the temperature and pressure of the gas in the container. Another system, based on the so-called reference system method, measures the temperature of the gas in the containment vessel and the differential pressure between a containment vessel and a reference vessel positioned within the containment vessel. One disadvantage of these methods is that in order to obtain a representative value of the gas temperature in the container a large array of temperature measurement devices must be positioned throughout the container volume. Another disadvantage of these known methods is the high uncertainty in the calculated leak rate from the measured variables due to the low precision of presently available temperature and pressure measuring devices.

It is therefore an object of the present invention to provide a system for decreasing the uncertainty in the measurement of the leak rate of a containment vessel.

It is another object of the present invention to provide a system for measuring the leak rate of a containment vessel which produces accurate measurements independent of the temperature or pressure of the gas in the containment vessel.

It is yet another object of the present invention to provide a system for measuring the leak rate of a gas container which is capable of remote operation.

It is yet another object of the present invention to provide a system for measuring the leak rate of a gas container which produces a continuous output representative of the leak rate.

SUMMARY OF THE INVENTION

In accordance with the invention, the gas leak rate of a containment vessel is determined by measuring the amount of gas flowing between the containment vessel and a reference vessel which has a single opening allowing the flow of gas between the two vessels. The reference vessel is positioned within the containment vessel such that the volume-temperature distribution of the gas in the reference vessel is approximately the same as the volume-temperature distribution of the gas in the containment vessel. A change in the amount of gas in the containment vessel due to leakage causes a change in gas pressure in the containment vessel which in turn causes an amount of gas to flow between the containment vessel and the reference vessel to equalize the gas pressures in the two vessels. Since, by the Ideal Gas Law, the amount of gas flowing through the reference vessel opening is proportional to the leakage of the containment vessel, a flow rate meter measuring the gas flow through the opening produces a reading representative of the leak rate.

BRIEF DESCRIPTION OF THE DRAWING

The single figure is a perspective view, with parts broken away, showing a containment vessel and the apparatus of the present invention for monitoring leakage from the containment vessel.

PREFERRED EMBODIMENT OF THE INVENTION

It is assumed that containment vessel 2, such as a nuclear reactor containment shell, contains a gas, such as air, at a certain pressure. It is further assumed that the gas in containment vessel 2 has a different temperature at different portions of the interior of the containment vessel. For example, the gas in the upper portion of the containment vessel 2 may be at a higher temperature than the gas in the lower portion of the containment vessel.

A leak-proof reference vessel 4, such as a two-inch diameter metal tube, containing the same gas as containment vessel 2 is positioned within the containment vessel.

It is desired, as will be shown below, that the temperature distribution of the gas in the reference vessel 4 approximates as closely as possible the temperature distribution of the gas in the containment vessel 2. Such an approximation of the temperature distribution of the gas in the containment vessel 2 by the gas in the reference vessel 4 may be obtained in various ways. One way, as shown in the figure, is to position the reference vessel in a plane through the main axis of the containment vessel 2 and such that it is in contact with the gas in the upper, middle, and lower portions of the containment vessel.

The reference vessel 4 has a single opening or orifice 6 which allows the flow of gas between the containment vessel 2 and the reference vessel 4. A conventional flow rate meter 8 is placed over the opening 6 and measures the quantity of gas flowing between the containment vessel 2 and the reference vessel 4. The output of the flow rate meter 8, such as an electrical signal having an amplitude representative of the measured gas flow, is connected, via a line 12, to a conventional recorder 10 positioned outside the containment vessel 2.

It is assumed that initially the gas pressure in the containment vessel 2 and the reference vessel 4 are equal. For purposes of description of the operation of the present leak rate measuring system it is further assumed that the pressure of the gas in containment vessel 2 is higher than the gas pressure outside the containment vessel, which may be atmospheric pressure.

In operation, when gas leaks through the walls of the containment vessel 2, the pressure of the gas in the containment vessel drops and gas from reference vessel 4 flows through opening 6, via the flow rate meter 8, to containment vessel 2 to equalize the gas pressures in the containment vessel and the reference vessel. The amount of gas flowing from reference vessel 4 to containment vessel 2 is measured by flow rate meter 8 and recorded by recorder 10.

As may be seen from the following considerations, the amount of gas measured by the flow rate meter 8 is proportional to the leak rate of the containment vessel 2.

The Ideal Gas Law is $$PV = mRT \quad (1)$$

where:
P = Pressure
V = Volume
m = Weight of gas present
R = Gas constant
T = Temperature The weight of the gas, $m$, can be written as:

$$m = \rho n \quad (2)$$

where $\rho$ is the density of the gas at standard conditions and $n$ is the number of standard cubic feet of the gas which is present. Thus Equation 1 becomes:

$$PV = nRT \quad (3)$$

Let the subscripts (1) and (2) denote the containment vessel and the reference vessel, respectively. Then for the two vessels:

$$\frac{P_1 V_1}{n_1 T_1} = \rho_1 R_1 \quad (4)$$

$$\frac{P_2 V_2}{n_2 T_2} = \rho_2 R_2 \quad (5)$$

The following observations may be made. Because the reference vessel and the containment vessel are initially pressurized with the same gas, $\rho_1$ is equal to $\rho_2$ and $R_1$ is equal to $R_2$. $T_1$ is approximately equal to $T_2$ since the reference vessel is so positioned in the containment vessel that the volume-temperature distribution of the reference vessel is approximately equal to the volume-temperature distribution of the containment vessel. $P_1$ is equal to $P_2$, since the pressure in the reference vessel and the containment vessel is equalized by the gas flow between these vessels. $V_1/V_2$ is a constant, C since the volume of neither vessel will appreciably change. Then the ratio of the quantities of gas in the two vessels is a constant, C, which is a function only of the vessel volumes, or, $$\frac{n_1}{n_2} = C = \frac{P_1 V_1 T_2}{P_2 V_2 T_1} \quad (6)$$

Assume that the containment vessel will lose $\Delta n_1$ cubic feet of gas during a given period of time. To equalize the pressure in the containment vessel and the reference vessel, $\Delta n_2$ cubic feet of gas will flow out of the reference vessel. Denoting the total leakage loss of gas from the two vessels by LKG cubic feet, then $$\Delta n_1 = LKG - \Delta n_2 \quad (7)$$

and $$\frac{n_1 - \Delta n_1}{n_2 - \Delta n_2} = c \quad (8)$$

Solving Equation 8 for $\Delta n_2$, using Equations 6 and 7 one obtains:

$$\Delta n_2 = \frac{LKG}{c+1} \quad (9)$$

As an example, assume that the containment vessel is a nuclear reactor containment shell having a volume $V_1$, equal to $3 \times 10^5$ cubic feet. Further assume that the reference vessel is 500 feet of two-inch diameter tubing having, thus, a volume $V_2$, equal to 10 cubic feet. When $$\frac{V_1}{V_2} = c \approx 3 \times 10^4 \gg 1 \quad (10)$$

For the example chosen, the approximation $$\Delta n_2 \approx \frac{LKG}{c} = \frac{V_2}{V_1}(LKG) \quad (11)$$

is therefore valid to within 0.003%.

Thus $\Delta n_2$, which is the value measured by the flow rate meter 8, is directly proportional to the total leakage loss of gas through the walls of containment vessel 2.

At present, commercial flow rate meters are available which will measure gas flow rates as low as 0.01 cc./min. with an accuracy of ±0.5% of the instrument full scale. Such flow rate meters, once calibrated, allow remote operation of the present leak rate measuring system in the containment vessel.

Comparing the results of an error analysis applied to the present leak rate measuring system and systems based on the so-called absolute method and reference method, referred to above, shows that the present leak rate measuring system has an uncertainty of approximately 1.3% as opposed to 5% and 25% for systems based on the reference method and the absolute method, respectively.

If the gas in all portions of the containment vessel has the same temperature and all temperature changes of the gas are equal in all portions of the containment vessel, the reference vessel need not, of course, be in contact with the gas in different portions of the containment vessel. In that case a simple vessel, such as a small cylindrical vessel placed at any point in containment vessel, will suffice.

It is to be noted that the present leak rate measuring system operates equally well if the gas pressure inside the containment vessel is lower than the gas pressure outside the containment vessel. The direction of gas flow in the reference vessel opening is then into the reference vessel since leakage now increases the pressure in the containment vessel relative to the pressure in the reference vessel.

Because only one measuring instrument is involved, a continuous output representative of the leak rate is produced by the present measuring system.

Persons skilled in the art will, of course, readily adapt the general teachings of the invention to embodiments other than the specific embodiment illustrated. Accordingly, the scope of the protection afforded the invention should not be limited to the particular embodiment shown in the drawings and described above.

The embodiments of the invention in which an exclusive property or privilege is claimed are defined as follows:

1. A system for measuring the leak rate of a gas-filled containment vessel having a constant volume, comprising:
   a leak-proof reference vessel having a constant volume and adapted to be disposed within said containment vessel, said reference vessel having an orifice allowing gas flow between said containment vessel and said reference vessel; and
   means for measuring the amount of gas flow through said orifice.

2. The system according to claim 1, wherein said means for measuring the gas flow through said reference vessel opening comprises a gas flow rate meter including an output representative of the amplitude of the measured gas flow.

3. The system according to claim 2 further including:
   recording means, including an input, for storing said flow rate meter output and
   means interconnecting the output of said flow rate meter and the input of said recorder.

4. The system according to claim 1, wherein said reference vessel comprises a long tube closed at one end thereof and having the other end thereof connected to said measuring means, the tube extending through many regions within said containment vessel so that the temperature distribution of the gas in said tube is substantially the same as the temperature distribution of the gas in said containment vessel.

5. An assembly comprising a containment vessel, and the system according to claim 4, the system being disposed in said containment vessel.

References Cited
UNITED STATES PATENTS

| | | | |
|---|---|---|---|
| 2,018,538 | 10/1935 | Webb | 73—194 |
| 2,989,863 | 6/1961 | Camilli et al. | 73—49.3 |
| 3,078,841 | 2/1963 | Brownson | 73—194 |

S. CLEMENT SWISHER, Primary Examiner

W. A. HENRY II, Assistant Examiner